Aug. 2, 1960  C. P. BRIDGES  2,947,524
BLENDER APPARATUS
Filed May 1, 1958  4 Sheets-Sheet 1
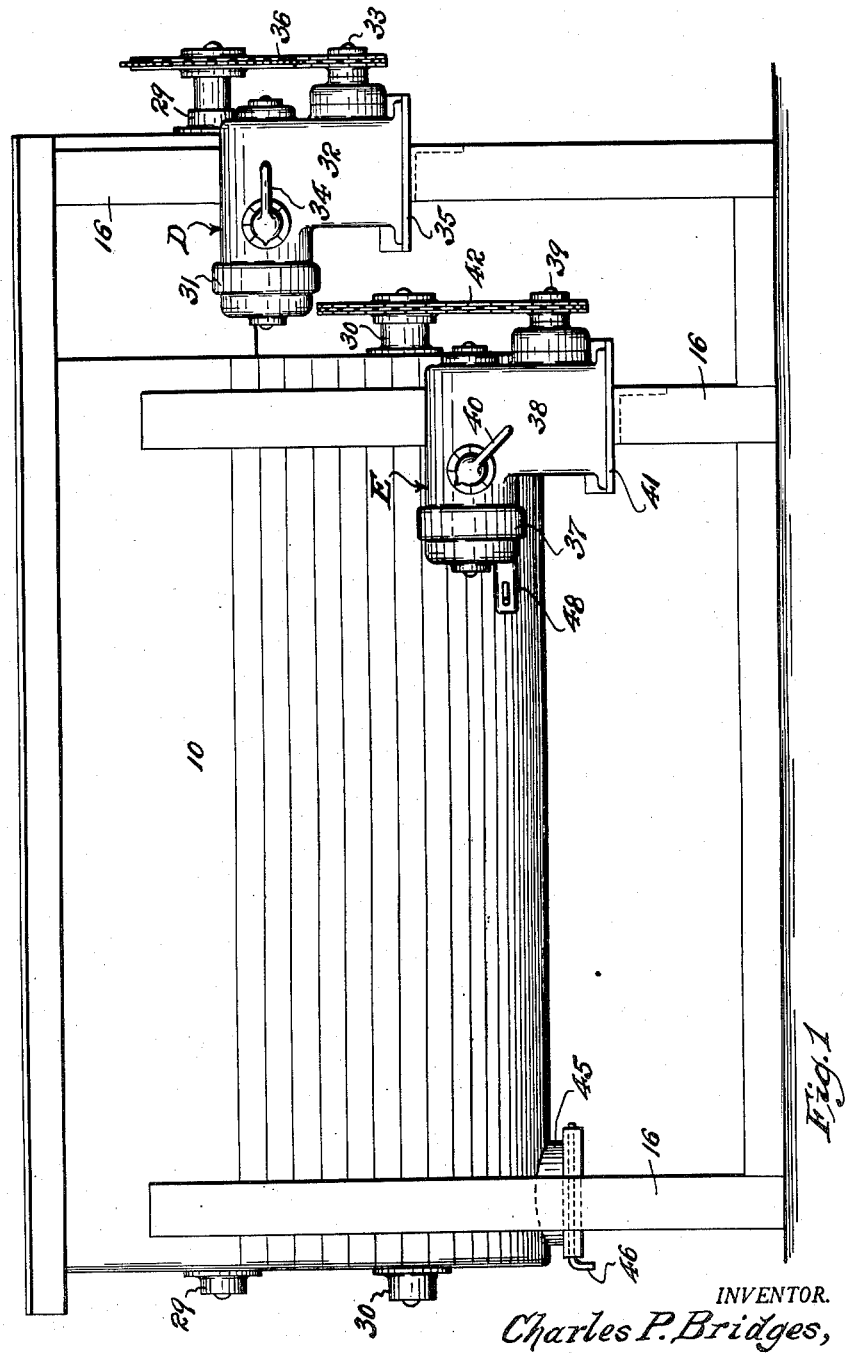
INVENTOR.
Charles P. Bridges,
BY Richard M. Cifelli,
Attorneys

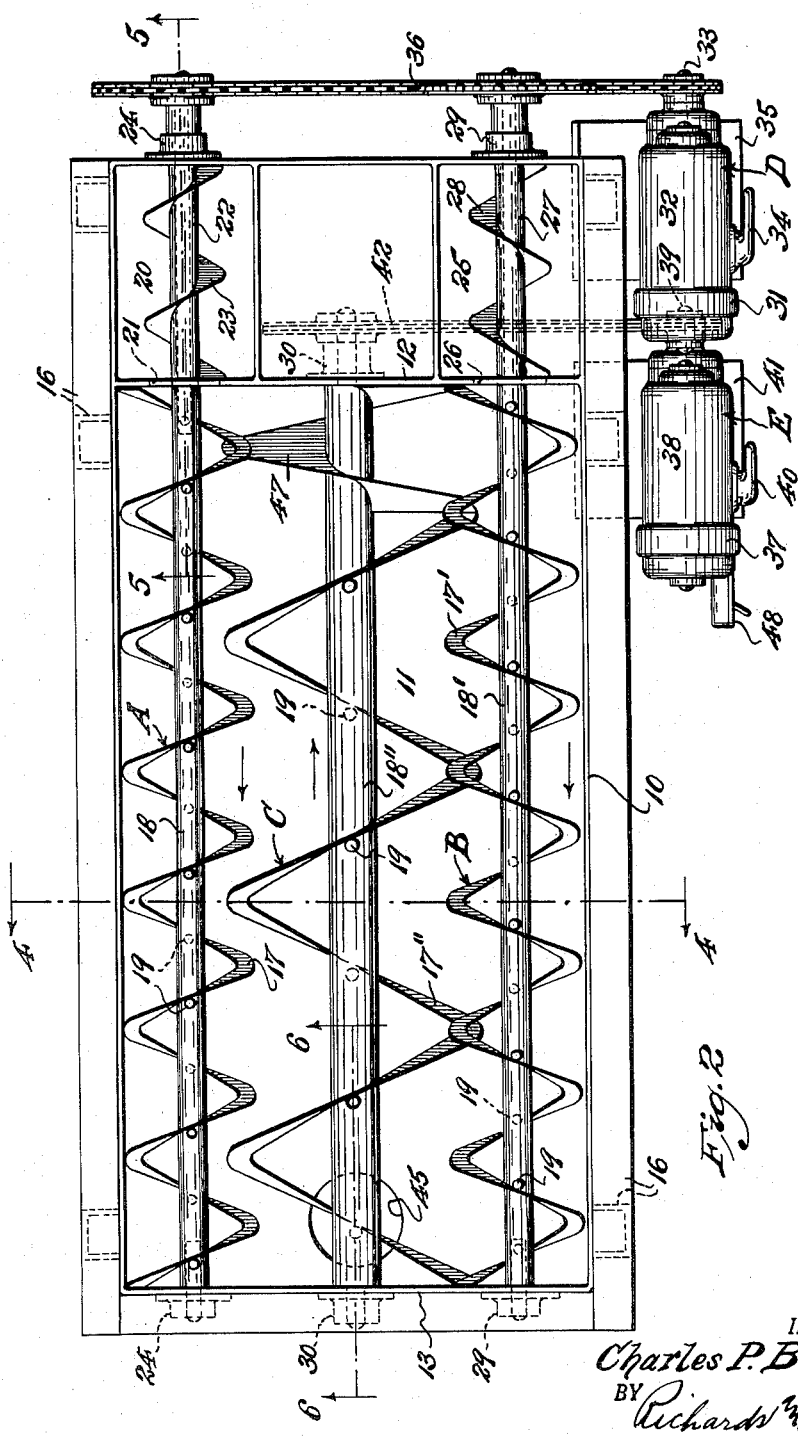

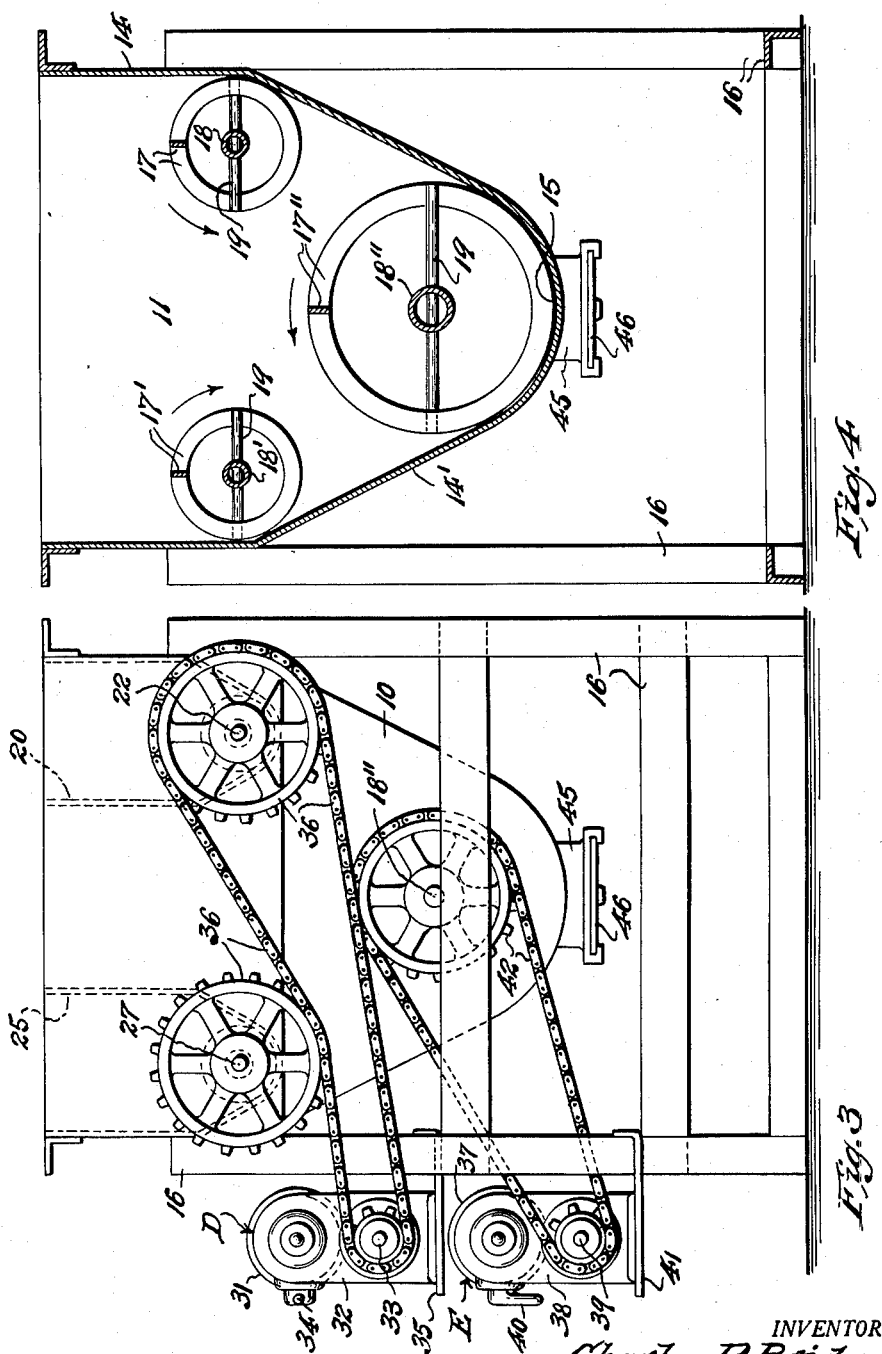

Aug. 2, 1960 C. P. BRIDGES 2,947,524
BLENDER APPARATUS
Filed May 1, 1958 4 Sheets-Sheet 4
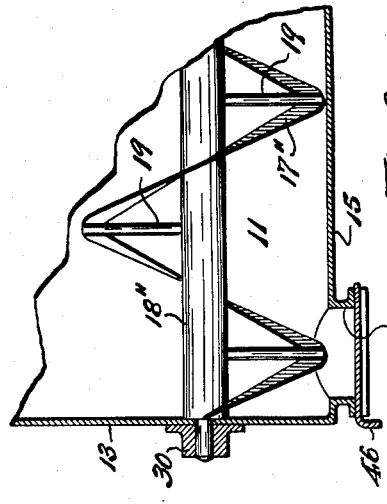
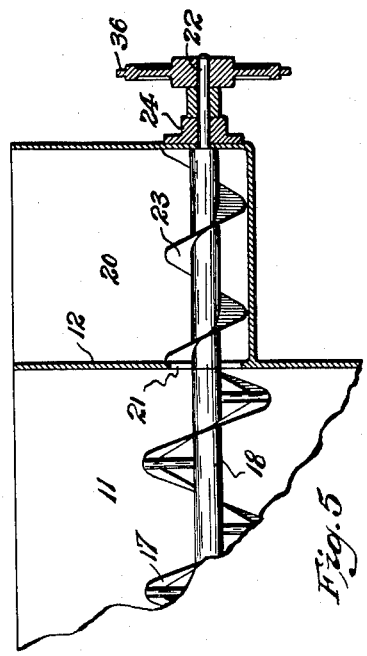
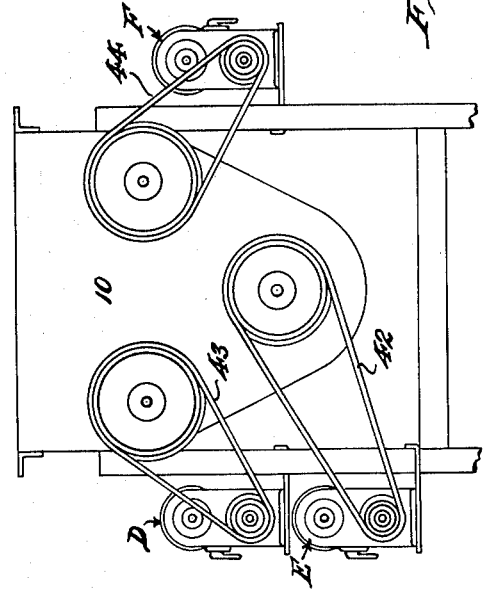
INVENTOR.
Charles P. Bridges,
BY Richard M. Cifelli,
Attorneys

United States Patent Office

2,947,524
Patented Aug. 2, 1960

2,947,524

BLENDER APPARATUS

Charles P. Bridges, P.O. Box 233, Morristown, N.J.

Filed May 1, 1958, Ser. No. 732,343

4 Claims. (Cl. 259—6)

This invention relates to improvements in blender apparatus operative to mix a plurality of substances or materials into a homogeneously blended mass.

This invention has for an object to provide improved blender apparatus comprising a mixing chamber or trough within which a plurality of rotatable helical agitating ribbons or screws extend longitudinally in selected spaced apart parallel relation, means being provided for varying at will, the driven speeds of said agitating ribbons or screws in relation one to another or others, accordingly as best suited to bulk densities and physical characteristics of the substances or materials to be blended in particular operations.

The invention has for a further object to provide, in blender apparatus as above characterized, means for supplying the substances or materials to be blended to the mixing chamber or trough; and means to discharge the blended substances or materials from the mixing chamber or trough, either by continuous or batch operation of the apparatus.

Other objects of this invention, not at this time more particularly enumerated, will be understood from the following detailed description of an illustrative embodiment of this invention; it being understood that said embodiment is merely typical, and that the several devices and parts shown can be varied in form and arrangement, and consequently the invention is not to be deemed limited to the particular forms and arrangements thereof as shown, except as may be required by the scope of the hereinafter appended claims.

In said drawings:

Fig. 1 is a side elevational view of a blender apparatus according to this invention; Fig. 2 is a top plan view of the same; Fig. 3 is an end elevational view of the same, viewed from the right in Fig. 1; and Fig. 4 is a transverse vertical sectional view, taken on line 4—4 in Fig. 2.

Fig. 5 is a fragmentary vertical longitudinal section, taken on line 5—5 in Fig. 2; and Fig. 6 is a fragmentary vertical longitudinal section, taken on line 6—6 in Fig. 2.

Fig. 7 is a schematic end elevational view, similar to that of Fig. 3, but showing a modified arrangement of variable speed driving means by which the agitating ribbons or screws of the apparatus are operated.

Similar characters of reference are employed in the above described views, to indicate corresponding parts.

Referring to said drawings, the reference character 10 indicates a shell or casing, the interior of which defines the upwardly open mixing chamber or trough 11 of the apparatus. Said shell or casing is preferably of rectangular shape, having end walls 12 and 13, and side walls 14, at the least the lower portions 14' of the latter being disposed to converge upon a rounded bottom portion 15. Said shell or casing 10 is supported by a suitable framework 16.

Mounted to extend longitudinally through the upper region of the mixing chamber or trough 11, between the end walls 12 and 13 of the shell or casing 10, respectively adjacent the side walls 14 of the latter, are upper helical agitating members A and B, which are parallelly disposed and spaced apart in a common horizontal plane; and mounted to extend longitudinally and centrally through the lower region of the mixing chamber or trough 11, between the end walls 12 and 13 of the shell or casing 10, contiguous to the rounded bottom portion 15 of the latter, is a lower agitating member C.

The upper helical agitating members A and B are of relatively small diameter and pitch, and respectively of such hand that, when rotated, the same will normally feed forward the substances or materials to be mixed from one to the opposite end of the mixing chamber or trough. The lower agitating member C is of relatively large diameter and pitch, and of such hand that, when rotated, the same will normally move rearward, or in opposite direction, the substances or materials undergoing blending or mixing treatment.

The helical agitating members A, B and C may be of any suitable screw type, but preferably they respectively comprise a helical ribbon or rib 17, 17' and 17" of selected diameter, pitch and hand, and radially spaced relative to their respective driving shafts 18, 18' and 18". Said ribbons or ribs are connected to their respective driving shafts by radial supporting arms 19.

Mounted in connection with one end wall, e.g. end wall 12, of the casing or trough 10 is a feed bin or magazine 20 which communicates with the upper interior of the mixing chamber or trough 11 through an intake or discharge port 21, provided in said end wall preferably concentric to the axis of the upper agitating member A. Suitably coupled to the shaft 18 of said upper agitating member A is a shaft extension 22 of a helical feed screw 23, which is operative, when rotated, to feed an ingredient of a mixture to be formed from the feed bin or magazine 20 into the mixing chamber or trough 11. The shaft 18 and shaft extension 22 are journaled in bearings 24. The outer end of the shaft extension 22 projects externally from the bin or magazine 20.

Similarly mounted in connection with said end wall 12 of the casing or trough 10 is another feed bin or magazine 25 which communicates with the upper interior of the mixing chamber or trough 11 through intake or discharge port 26 in said end wall, preferably concentric to the axis of the upper agitating member B. Suitably coupled to the shaft 18' of said upper agitating member B is a shaft extension 27 of a helical feed screw 28, which is operative, when rotated, to feed another ingredient of a mixture to be formed into the mixing chamber or trough 11. The shaft 18' and shaft extension 27 are journaled in bearings 29. The outer end of the shaft extension 27 projects externally from the bin or magazine 25.

The shaft 18" of the lower agitating member C is journaled in bearings 30 mounted in connection with the end walls of the shell or casing 10; an end of said shaft projecting from an end wall, e.g. end wall 12, of said shell or casing 10.

Means is provided for driving the upper agitating members A and B in such manner as to vary, adjust and control, at will, the rotative speed thereof. Similarly, means is provided for driving the lower agitating member C in such manner as to vary, adjust and control, at will, the rotative speed thereof. By this arrangement, the relative speeds of said upper and lower agitating members can be quickly and easily changed at will accordingly as may be desirable for rapidly and thoroughly mixing and blending the ingredients of particular mixtures to be formed.

A simple arrangement (as shown in Figs. 1, 2 and 3) which is adapted to provide for such speed adjustment and control of the upper agitating members A and B, when these members are to be driven at the same selected speed, illustratively comprises a variable speed driving and transmission device D. This device comprises an electric motor 31, as a power source, which drives a speed varying transmission 32 to operate a power delivery shaft 33, the speed varying transmission being subject to manipulatable adjustment by a control dial and lever 34. This device D is supported upon a suitably located platform 35 mounted in connection with the framework 16 of the blender apparatus. The power delivery shaft 33 drives the shafts 18 and 18' and their extensions 22 and 27 by sprocket and chain or other suitable transmission means 36. A similar variable speed driving and transmission device E is provided for operation of the lower agitating member C, the same likewise comprising an electric motor 37 as a power source which drives a speed varying transmission 38 to operate a power delivery shaft 39; this speed varying transmission being also subject to manipulatable adjustment by a control dial and lever 40. The device E is supported upon a suitably located platform 41 mounted in connection with the framework 16 of the blender apparatus. The power delivery shaft 39 drives the shaft 18" by sprocket and chain or other suitable transmission means 42.

It may be desirable, in some cases, to independently drive the respective upper agitating members A and B at respectively different speeds relative to each other and respectively relative to the speed of the lower agitating member C. In such case, an independent variable speed driving and transmission device for each agitating member A and B may be provided. This is schematically shown in Fig. 7, wherein a variable speed driving and transmission device D drives only the agitating member B through a chain and sprocket or other suitable transmission means 43, and another variable speed driving and transmission device F independently drives the agitating member A through a chain and sprocket or other suitable transmission means 44.

The shell or casing 10 is provided with a discharge means in the form of material outlet 45 leading downwardly out of the bottom of the mixing chamber or trough 11, adjacent to an end of the latter. Said discharge means can be opened and closed by a manipulatable gate plate 46 with which it is provided.

Inlet ports 21 and 26 provide material inlets for introducing materials to be blended at a position spaced longitudinally along the chamber 11 from the material outlet 45 so that the materials are subjected to the action of the agitation before arriving at the outlet 45.

As shown in Fig. 2, the lower agitating member C is preferably provided, adjacent the end wall of the mixing chamber or trough 11 toward which said agitating member C normally functions to move the mixture under treatment, with a short helical wiper blade 47 of hand opposite to the hand of the helical ribbon or rib 17" of said agitating member C. This helical wiper blade 47 functions to prevent jamming of the mixture against said end wall of the mixing chamber or trough, thus not only preventing undue frictional resistance to the operation of said lower agitating member C, but tending to cause the mixture to rise or upflow back to a level where its movement is reversed by the upper agitating members A and B, thereby assuring desired circulation of the mixture within the mixing chamber or trough 11.

It may here be pointed out that the open top of the mixing chamber or trough 11 can be closed by a cover (not shown), if desired. It is also pointed out that should a liquid additive be reqiured to be used in the mixing of a plurality of dry ingredients, suitable means (not shown), such e.g. as a spray pipe, may be utilized to apply the liquid additive to the substances or materials undergoing mixing treatment within the mixing chamber or trough 11. It is further pointed out that the shell or casing 10 may be provided with means (not shown) for applying a heating or cooling medium thereto, if hot or cool treatment of the mixture is desired in connection with the preparation thereof. All these expedients are already well known to the art.

The improved blender apparatus, as illustratively shown and above described, results from the fact of my discovery that rapid and thorough mixing and blending of a plurality of ingredients of a mixture to be formed cannot be efficiently attained unless the relative rotating speeds of the upper and lower agitating members can be varied, adjusted and controlled to suit the characteristics of the particular ingredients of the mixture to be produced. I have found that if the rotating speeds of the upper and lower agitating members are not relatively variable and controlled to suit different bulk densities of mixtures to be formed, and also to suit different physical characteristics of the ingredients to be mixed, such as flowability, stickiness, weight, etc., the apparatus will not function satisfactorily, and tendency arises that the mixture will pile up at one end or the other of the mixing chamber or trough, with risk of overflowing the latter. Furthermore, due to ability to vary, adjust and control relative speeds of upper and lower agitating members, which my invention provides for, a blender apparatus has been obtained which, in operation, will mix and blend a plurality of ingredients with such rapidity that the required residence time of a given mixture in the mixing chamber or trough can be so sharply reduced that it is practical to feed the ingredients into one end of the apparatus, mix and blend the same, and then discharge the resulting mixture from the apparatus in a continuous manner. Tests on various compounds have shown that a residence time, in the apparatus of this invention, of 30 to 120 seconds will attain the same high quality mixed product as requires a residence time of from 5 to 20 minutes in blender apparatus of types heretofore in use.

For example, detergent powders are produced in many varieties of weight, particle size, and components, and are adapted to be mixed with varying amounts and kinds of liquid additives. Tests have shown that with multiple rotating agitating members, such as my apparatus employs, adjustment and control of relative speeds of the agitating members can produce high quality mixing and blending of such detergent compounds in seconds instead of minutes. Consequently, when the apparatus is operated batch-wise, up to twice as many batches can be prepared and delivered in a given length of time, and, when the apparatus is operated continuously, a unit of moderate physical size will produce a high rate of output by reason of the comparatively low residence or retention required.

It has also been observed that with respect to heavy detergent mixtures, including large quantities of liquid additives, it is desirable to operate the lower agitating member C at a low speed and the upper agitating members A and B at relatively high speeds, in order to rapidly obtain the desired blending effect. On the other hand, with respect to light powders, including small quantities of liquid additives, the lower agitating member C should be driven at high speed and the upper agitating members A and B at relatively lower speed. By such controlled speed operations, the power requirement for different products can be kept substantially constant, and satisfactorily blended mixtures for different products can be obtained in approximately the same length of time.

It has also been observed and demonstrated that the blender apparatus of this invention can be satisfactorily employed for coating operations. For example, it being desired to add vitamins to white rice, and to coat the rice grains with shellac and talc in order to retain the vitamin content, when the shellac is added, the mass tends to become increasingly tacky and heavy, but by reducing the speed of the lower agitating member C, and operating the upper agitating members A and B at relatively high speed, rapid coating can be achieved before the solvent in the shellac solution has opportunity to evaporate, with tendency to form the mixture into agglomerated lumps. As soon as the coating is evenly dispersed upon the rice grains, and talc is added, the power required to stir or mixingly agitate the mass is reduced, and by increasing the speeds of the agitating members, the rice grains are tossed about in such manner as to quickly dry off and harden the produced coating. In this manner, multiple coatings can be applied in a comparatively short space of time. Such coating operations are not possible of rapid and effective attainment by use of conventional blenders in which the agitating members are operable at only given fixed relative speeds.

It will also be understood that independent adjustment and control of relative speeds of the lower and upper agitating members is important in maintaining a substantially constant level of the substances and materials treated within the mixing chamber or trough 11. If the large lower agitating member C is operated too fast with respect to the speeds of the upper agitating members A and B, the mixture will tend to pile up at the end of the mixing chamber or trough toward which the mixture is moved by the lower agitating member. If, on the other hand, the upper agitating members A and B are operated at too high a speed relative to that of the lower agitating member C, the mixture will tend to pile up at the end of the mixing chamber or trough toward which the mixture is moved by said upper agitating members. Such undesirable effects are avoided when the relative speeds of the lower and upper agitating members are subject to variation, adjustment and control.

As already above intimated, the blender apparatus of this invention can be operated either batch-wise or continuously. If operated batch-wise, the discharge means 45 is closed until the blended mixture is completed, whereupon the gate plate 46 of said discharge means is opened, and the mixing chamber or trough is evacuated by reversing the direction of rotation of the lower agitating member C. The motor 37 of the variable speed driving and transmission device E can be controlled by a reversing switch 48, whereby to reverse the transmission, and thus the direction of the rotation of the lower agitating member C. If, on the other hand, the blender apparatus is desired to be continuously operated, the discharge means 45 is initially closed, until an initial mixture is prepared, whereafter said discharge means is opened for outflowing of the prepared mixture, and, in the meantime, replenishing supply of mixture ingredients to be treated will be continuously delivered into the mixing chamber or trough 11 through the respective intake ports 21 and 26 from the supply bins or magazines 20 and 25 by their feed screws 23 and 28.

Having now described my invention, I claim:

1. Blender apparatus comprising an elongated horizontal mixing trough having a rounded bottom and receiving and discharge ends, a blended material discharge means at the discharge end, a pair of laterally spaced apart rotatable top agitating members extending longitudinally within the upper region of the mixing trough between its ends and respectively adjacent to side walls of the latter, said agitating members, when rotated, being adapted to move the material operated upon endwise from the receiving end of the mixing trough toward the discharge end thereof, a rotatable bottom agitating member extending longitudinally within the lower region of the mixing trough between its ends contiguous to the rounded bottom thereof and below and intermediate said top agitating members, said bottom agitating member, when rotated, being adapted to normally move the material operated upon endwise through the mixing trough in a direction opposite to the movement of said material by said top agitating members, whereby said material is circulated longitudinally within the mixing trough between the receiving and discharge ends thereof, means disposed in the plane of the top agitating members for introducing materials to be operated upon into the receiving end of the mixing trough, power actuated changeable speed transmission means to drive the top agitating members at variable speed, and separate power actuated changeable speed transmission means to drive the bottom agitating member at a variable selected different speed relative to the driven speed of the top agitating members.

2. Blender apparatus according to claim 1, wherein the changeable speed transmission means for driving the bottom agitating member is reversible.

3. Blender apparatus according to claim 1, wherein the bottom agitating member includes a coaxial short helical wiper blade of hand opposite to the hand of said bottom agitating member, said wiper blade being disposed to wipe the end wall of the mixing trough toward which material operated upon is normally moved by said bottom agitating member.

4. Blender apparatus according to claim 1, wherein the means for introducing materials to be operated upon comprises separate feed bins for different material ingredients, said bins being respectively connected with the receiving end of the mixing trough and having respective discharge ports opposed to the receiving end of respective top agitating members, each bin having a longitudinal feed screw aligned with its discharge port and adapted to be driven with the top agitating member to which said port is opposed.

References Cited in the file of this patent

UNITED STATES PATENTS

| | | |
|---|---|---|
| 1,344,675 | Bubar et al. | June 29, 1920 |
| 1,603,546 | Kirschbraun | Oct. 19, 1926 |
| 1,703,465 | Woodhead | Feb. 26, 1929 |
| 1,750,645 | Offenhauser | Mar. 18, 1930 |
| 1,880,626 | Wilmoth | Oct. 4, 1932 |
| 2,320,469 | Rasmussen | June 1, 1943 |
| 2,321,838 | McBean | June 15, 1943 |
| 2,570,864 | Rowlson | Oct. 9, 1951 |
| 2,743,850 | Hamilton | May 1, 1956 |
| 2,813,704 | MacKissic | Nov. 19, 1957 |
| 2,820,618 | Bolling | Jan. 21, 1958 |
| 2,828,112 | Kammer | Mar. 25, 1958 |